Nov. 10, 1953 W. W. SALISBURY 2,659,000

VARIABLE FREQUENCY CYCLOTRON

Filed April 27, 1951 2 Sheets-Sheet 1

INVENTOR.

BY WINFIELD W. SALISBURY

Marvin Moody

ATTORNEY

Nov. 10, 1953 W. W. SALISBURY 2,659,000

VARIABLE FREQUENCY CYCLOTRON

Filed April 27, 1951 2 Sheets-Sheet 2

INVENTOR.

BY WINFIELD W. SALISBURY

Marvin Moody

ATTORNEY

Patented Nov. 10, 1953

2,659,000

UNITED STATES PATENT OFFICE 2,659,000

VARIABLE FREQUENCY CYCLOTRON

Winfield W. Salisbury, Cedar Rapids, Iowa, assignor to Collins Radio Company, Cedar Rapids, Iowa, a corporation of Iowa Application April 27, 1951, Serial No. 223,327

6 Claims. (Cl. 250—27)

This invention relates to means for controlling the frequency of a synchro-cyclotron with a frequency modulated oscillator which supplies an input to the dee chamber.

Synchro-cyclotrons or frequency modulated cyclotrons may be controlled by varying the capacitance of the dee system with a rotating condenser driven by a motor. If the dee system is de-tuned, for any reason, the power developed in the cyclotron falls appreciably and it is an object of this invention to provide a frequency modulated oscillator which is synchronized with the tuning condenser and which feeds an input into the dee chamber to stabilize the cyclotron. This apparatus might be thought of as providing a feedback voltage to the cyclotron to thus stabilize the resulting operating frequency.

It is an object of this invention, therefore, to provide a synchronized feedback frequency modulated oscillator which furnishes an input to the dee chamber of the cyclotron.

Another object of this invention is to provide a stabilizing input to the cyclotron derived from a replica condenser mounted on the main condenser tuning shaft. The replica condenser controls the frequency modulated oscillator which supplies the feedback.

Still another object of this invention is to provide a frequency modulated cyclotron which has a feedback system comprising a frequency modulated oscillator.

It is a feature of this invention to provide synchronizing means in a frequency modulated cyclotron which in controlled by a rotating condenser coupled to the dee system and which has a replica of the tuning condensers mounted on the driven shaft. The replica condenser is excited by a constant frequency oscillator to derive an output voltage proportional to the variation in capacitance of the replica condenser. The output of the replica condenser is rectified, and furnished to a frequency modulated oscillator which has the characteristic that its frequency is controlled by the direct current signal supplied to it. The output of the frequency modulated oscillator is fed into the dee chamber as a feedback to obtain frequency stabilization.

Further objects, features, and advantages of this invention will become apparent from the following description and claims when read in view of the drawings, in which;

Synchro-cyclotrons are known to those skilled in the art and for a more detailed description reference may be made to the Physical Review, volume 68, pages 143–145 (1945) and Advances of Electronics, volume 1, pages 300–306, M. Stanley Livingston, published 1948 by Academic Press of New York.

Figure 1:
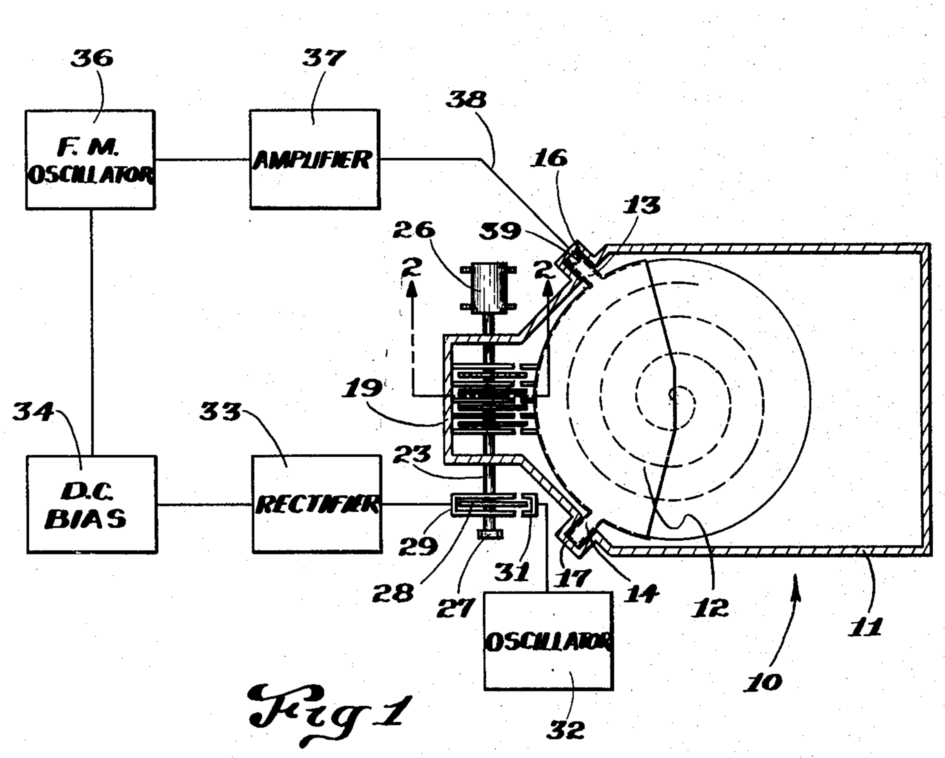
Figure 1 illustrates a frequency modulated cyclotron with the synchronizing system of this invention installed therein; and, Figure 2 is a sectional view taken on line 2—2 of Figure 1.

Figure 1 illustrates a synchro-cyclotron, designated generally as 10, which is formed with a cover 11 in which is mounted a dee 12. The dee is formed with a pair of stems 13 and 14 which are received in projections 16 and 17, respectively, formed in the cover 11 and are electrically connected to them.

Figure 2:
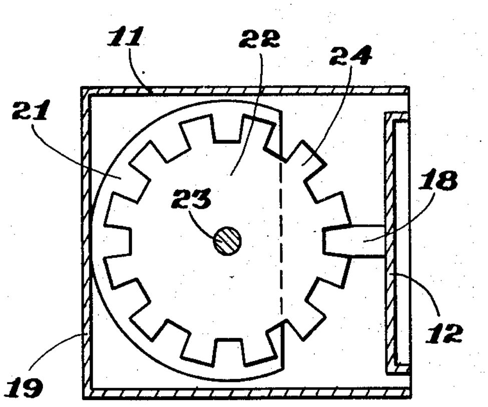
Figure 3:
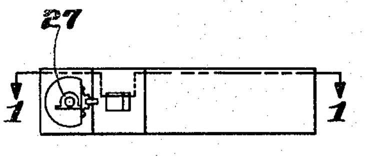
Figure 3 is a side view of the dee chamber illustrating the replica condenser of this invention.

Mounted on the rear of the dee 12 are a plurality of stator condenser plates 18, as best shown in Figure 2. The cover wall 11 has an extension 19 which extends over the plates 18. A plurality of second stator plates 21 are attached to the inside wall of extension 19 and are generally semi-circular in shape.

Rotor condenser plates 22 are mounted on a shaft 23 which is supported in suitable bearings in the extension 19. The rotor plates 22 are formed with projections 24 and it may be seen in Figure 1 that the stator plates 18 and 21, and rotor plates 22 intermesh so that the rotor may turn without engaging the stator plates.

The extension 19 is a part of the wall 11 which is grounded and thus the rotation of rotor 22 varies the capacitance to ground of the dee 12. The dee is grounded at the projections 13 and 14 but one-half wave length exists between these points so that an anti-nodal point is formed where the stators 18 are connected to the dee 12.

The shaft 23 extends out of the cover 11 and is connected at one end to a motor 26. The opposite end is mounted in a bearing 27. A rotor plate 28 is mounted between the bearing 27 and the wall 11. The rotor plate 28 has the same shape as the rotor plates 22. A pair of stator plates 29 and 31 are mounted adjacent the rotor plate 28. The stator plates 29 and 31 are generally U-shaped and their active portions that extend parallel to the rotor plate 28 are of the same general shape as the stator plates 18 and 21, respectively.

The small stator plate 31 receives an electrical input from an oscillator 32 which oscillates at a fixed frequency. The large stator plate 29 is connected to a rectifier 33 and the output of the rectifier 33 is proportional to the position of the shaft 23. The oscillator 32 might oscillate at 100 kilocycles, for example, and the output of the rectifier 33 will produce a direct current output proportional to the shaft position.

A direct current biasing means 34 receives the output of rectifier 33 to add an adjustable direct current voltage. The output of rectifier 33 is supplied to a frequency modulated oscillator 36 which will be described in detail later. The oscillator 36 has the characteristic that its frequency may be controlled by the amplitude of a direct current potential. The output of the oscillator 36 is fed to an amplifier 37 which increases its amplitude and couples it to the dee through a lead 38 terminating in a coupling loop 39 within the stem 13 of the dee.

The invention as described therefore utilizes a replica of the tuning condenser to obtain a direct current voltage to control the frequency of a direct current controlled oscillator whose output is fed back into the dee chamber.

In that the tuning condenser comprising the rotor plates 22 and stator plates 18 and 21 provide the frequency variation in the resonant dee system, the output of the oscillator 36 will be the same as the desired operating frequency.

Uncontrollable factors within the dee chamber, however, sometimes prevent the frequency within the dee chamber from remaining constant and the oscillator 36 provides a feedback which will stabilize the oscillator system of the cyclotron to prevent it from operating at spurious frequencies.

Attempts have been made to provide a stabilizing feedback for a cyclotron of this nature by coupling a small amount of energy from the cyclotron, amplifying it, and feeding it back into the chamber as a stabilizing component. This procedure, however, has not been wholly successful for the reason that the feedback signal is not independent of the undesirable effects present in the cyclotron chamber. Applicant's replica condenser comprising the rotor 28 and the stators 29 and 31 is independent of the resonant conditions within the dee chamber and thus a feedback signal controlled in frequency by this condenser will be independent of the conditions existing within the dee chamber.

Figure 6:
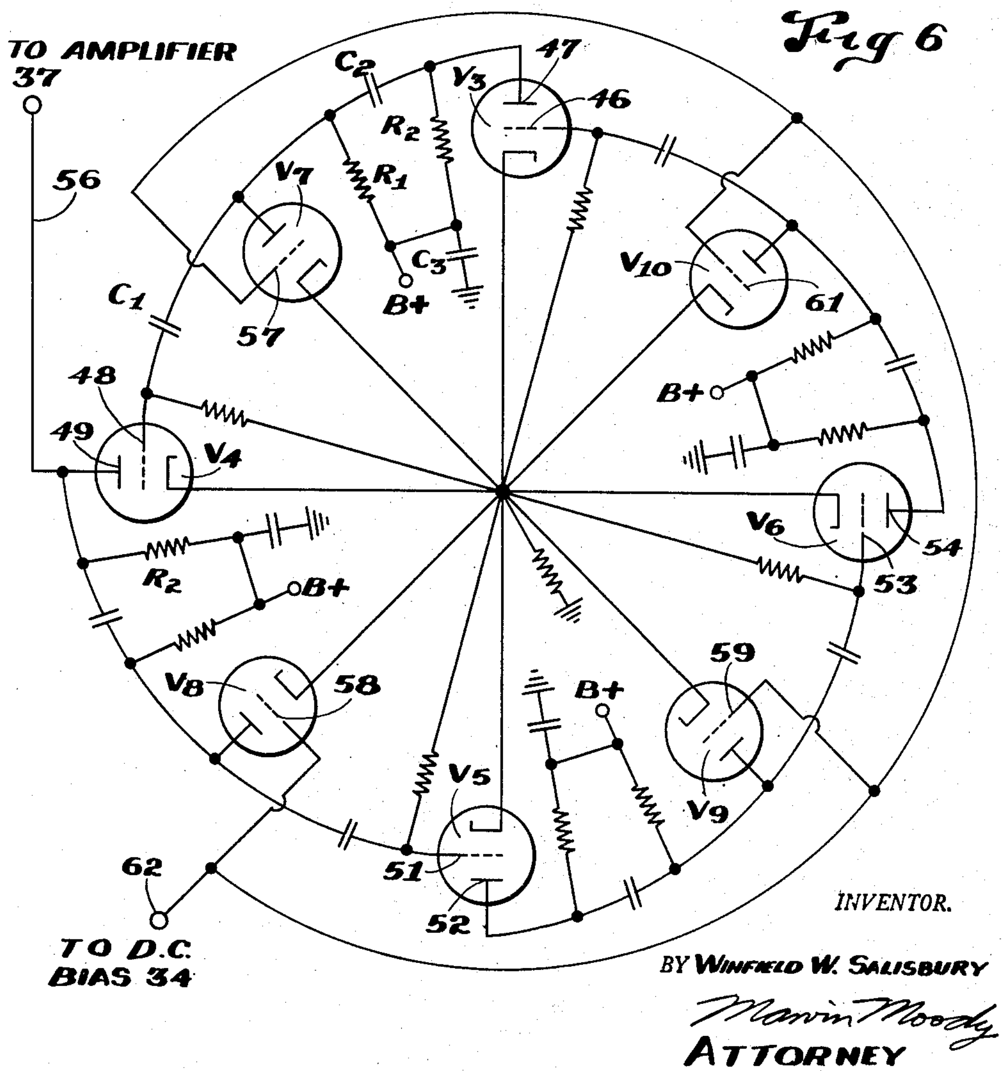

The frequency modulated oscillator 36 is shown in detail in Figure 6. It is a phase shift oscillator and basically is derived from the oscillator illustrated in Figure 4. The oscillator 36 must be capable of varying its frequency over broad limits very rapidly. For example, applicant has built an oscillator variable from 18 to 26 megacycles during an operating cycle of the cyclotron.

Figure 4:
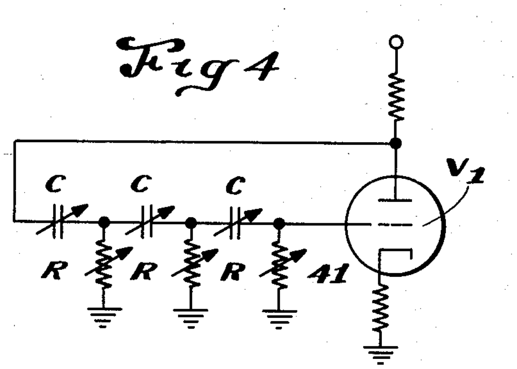
Figure 4 illustrates a phase shift oscillator.

The basic phase shift oscillator, as shown in Figure 4, comprises a tube $V_1$ which is a broad band amplifier. The output of the plate of the amplifier $V_1$ is connected to a phase shift circuit comprising the condensers C and the resistors R. The output of the phase shift circuit is fed to the control grid 41 of the broad band amplifier $V_1$ and the circuit will oscillate if the loss through the phase shift circuit is less than the gain of the tube. The frequency of oscillation is determined by the phase shift of the phase shift network. The signal supplied to the grid 41 must be 180 degrees (or some odd multiple thereof) out of phase with the plate signal for oscillation to occur. Thus, if the phase shift through the phase shifting circuit is varied the resonant frequency will change.

Suppose, for example, that in the phase shift circuit of Figure 4 the values of C are equal and the values of R are equal. For oscillation to occur the phase shift across the three sections must be 180 degrees, or 60 degrees across each RC section. By varying the resistors R, or capacitors C the resonant frequency will change. For a more detailed description of the phase shift frequency modulation oscillator, reference may be made to page 1328 of volume 27 of the Proceedings of the Institute of Radio Engineers.

Figure 5:
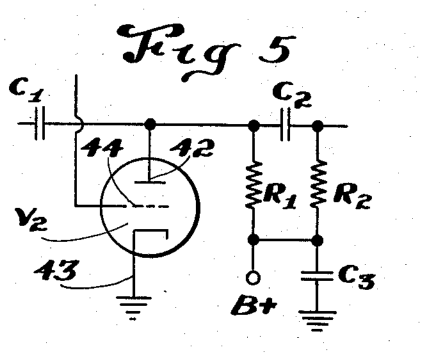
Figure 5 illustrates a means of varying resistance with a direct current potential; and, Figure 6 is a frequency shifting oscillator which embodies the principles of the circuits of Figures 4 and 5.

Figure 5 illustrates a circuit for varying the phase shift in an RC circuit with a direct current voltage. The condenser $C_1$ is connected to the plate 42 of a tube $V_2$ which has its cathode 43 connected to ground and a second condenser $C_2$ is connected to the condenser $C_1$. A pair of resistors $R_1$ and $R_2$ are connected between B+ and opposite sides of the condenser $C_2$. A by-pass condenser $C_3$ is connected between B+ and ground.

The condensers $C_1$, $C_2$, resistors $R_1$ and $R_2$, with a tube $V_2$ comprise a phase shift circuit. The tube $V_2$ has a plate resistance depending upon the bias placed on grid 44, and thus tube $V_2$ is analogous to the variable resistors illustrated in Figure 4. If the bias supplied to grid 44 is varied, the plate resistance of the tube will be varied and the phase shift across circuit of Figure 5 will change.

It is seen that the circuit of Figure 5 makes it possible to control the phase shift of a circuit with a direct current voltage applied to the grid 44. By utilizing this principle applicant has designed the circuit of Figure 6.

The circuit of Figure 6 might be thought of as four phase shift oscillators of the type shown in Figure 4 connected in series so that the gain of each amplifier is additive and the output is therefore greater. Instead of using the phase shift circuit shown in Figure 4 applicant has used a phase shift circuit such as shown in Figure 5 to control the frequency of the four oscillators.

The tubes $V_3$, $V_4$, $V_5$ and $V_6$ are the broad band amplifier tubes which correspond to tube $V_1$ in Figure 4. The tubes $V_7$, $V_8$, $V_9$, and $V_{10}$ correspond to the tube $V_2$ in the phase shift circuit of Figure 5. If the tube $V_3$ is to be used in a phase shift oscillator, it is known that for oscillation to occur, the feedback received on grid 46 must be 180 degrees (or some odd multiple thereof) out of phase with the plate voltage on plate 47.

Assume that the phase shift between plate 47 and the grid 48 of tube $V_4$ is 90 degrees. The phase shift between plate 49 and the grid 48 of tube $V_4$ will be 180 degrees and the phase shift between the plate 49 and the plate 47 will be equal to 180 degrees plus 90 or 270 degrees. Assume once again that the phase shift between the plate 49 and the control grid 51 of tube $V_5$ is 90 degrees. The phase shift between the grid 51 and the plate 52 will be 180 degrees so that the phase shift between the plate 52 and the plate 47 will be 540 degrees.

If the phase shift between the plate 52 and the grid 53 of tube $V_6$ is assumed to be 90 degrees, then the plate 54 of tube $V_6$ will be 810 degrees out of phase with the plate 47 of tube $V_3$. If the phase shift between the plate 54 and the grid 46 is 90 degrees then the total phase shift between the grid 46 and the plate 47 of tube $V_3$ will be 900 degrees, which is equal to (5×180) and thus, oscillation can occur.

The output of any of the tubes $V_3$, $V_4$, $V_5$, or $V_6$ may be used as the oscillator's output. A lead 56 is connected to plate 49 of tube $V_4$ and is connected to the amplifier 37.

The phase shift tubes $V_7$, $V_8$, $V_9$, and $V_{10}$ have their control grids 57, 58, 59 and 61, respectively, connected together and to terminal 62 which is connected to the direct current bias 34. Thus, the bias applied to terminal 62 varies the plate resistance of the tubes $V_7$ through $V_{10}$, and results in a varying phase shift through the phase shift circuits. It is seen that the circuitry between the amplifiers $V_3$ and $V_4$ corresponds to the phase shift circuitry of Figure 5. Each of the phase shift circuits between amplifiers are the same.

In that each phase shift circuit has only a 90 degree phase shift rather than a 180 degree phase shift, less loss will be encountered than in the circuit of Figure 4. It is well known that in an RC phase shift circuit, the greater the phase shift, the greater the attenuation.

It is to be understood, of course, that the ring oscillator of Figure 6 may be modified to add more or less phase shift oscillator segments. The input to each amplifier grid must remain 180 degrees (or some odd multiple) out of phase with the plate voltage.

It is seen that this invention provides a stabilizing feedback system for a synchro-cyclotron which has a novel ring oscillator.

Although the invention has been described with respect to a preferred embodiment thereof, it is not to be so limited as changes and modifications may be made therein which are within the full intended scope as defined by the appended claims.

I claim:

1. Means for controlling the frequency of a synchro cyclotron comprising, a cover member, a dee system mounted within said cover member, a rotor shaft rotatably supported by said cover member, first rotor condenser plates mounted on said rotor shaft within said cover member, first stator condenser plates mounted on the dee system, second stator condenser plates connected to the cover member, a driving means mounted to the rotor shaft externally of the cover member, third stator condenser plates of the same general shape as the second stator condenser plates mounted adjacent said rotor shaft, second rotor condenser plates mounted on the rotor shaft adjacent the third stator condenser plates, fourth stator condenser plates mounted adjacent the second rotor condenser plates and the third stator condenser plates, an oscillator connected to the third stator condenser plates, a frequency modulation oscillator with its frequency controlled by direct current bias from the rectifier, and a feedback loop within the cover member receiving an input from the frequency modulation oscillator to couple energy to the dee system.

2. Means for controlling the frequency of a frequency modulation cyclotron comprising, a driving means, a rotor shaft rotatably supported by the cyclotron, first rotor condenser plates mounted on said rotor shaft, a dee mounted within said cyclotron, first stator condenser plates mounted on the dee, second rotor condenser plates and second and third stator condenser plates, said second rotor condenser plates mounted on said rotor shaft externally of said cyclotron, said second and third stator condenser plates mounted adjacent the second rotor condenser plates, a first frequency oscillator supplying an input to the second stator condenser plates, a rectifier receiving an input from the third stator condenser plates, a frequency modulation oscillator with its frequency controllable by direct current received from said rectifier, and an energy coupling means connected to the output of the frequency modulation oscillator to couple it into the dee system of the cyclotron.

3. Means for controlling the frequency of a synchro cyclotron comprising, a driving means, a rotor shaft rotatably supported by said cyclotron and connected to said driving means, first rotor condenser plates mounted on the rotor shaft within the cyclotron, first and second stator condenser plates mounted in the cyclotron adjacent the first rotor condenser plates, second rotor condenser plates mounted on the rotor shaft, third and fourth stator condenser plates mounted adjacent the second rotor condenser plates, a first frequency oscillator connected to and supplying an input to the third stator condenser plates, a rectifier connected to the fourth stator condenser plates, a frequency modulation oscillator receiving an input from said rectifier and varying the frequency of its output in response thereto, and energy coupling means receiving the output of the frequency modulation oscillator and coupling it into the dee system of the cyclotron.

4. Means for controlling the frequency excursions of a synchro cyclotron comprising, a cover member, a dee system mounted within the cover member, a rotor shaft rotatably supported by the cover member, a driving means connected to the rotor shaft, first rotor condenser plates mounted on the rotor shaft within the cover member, second rotor condenser plates mounted on the motor shaft externally of the cover member and of the same general shape as the first rotor condenser plates, first and second stator condenser plates mounted within said cyclotron adjacent said first rotor condenser plates, third and fourth stator condenser plates mounted externally of the cyclotron adjacent the rotor condenser plates, a first frequency oscillator connected to the third stator condenser plates, a rectifier receiving an input from the fourth stator condenser plates, a direct current biasing means receiving the output of the rectifier and producing a varying direct current output, a frequency modulation oscillator with its frequency controlled by the output of the direct current biasing means, and energy coupling means receiving the output of the frequency modulation oscillator to couple it into the dee system of the cyclotron.

5. Apparatus according to claim 4 wherein said frequency modulation oscillator comprises, a plurality of phase shift oscillators with their outputs connected in series and the phase shift portions of each phase shift oscillator having tubes whose plate resistance may be varied by the direct current bias on their grids, and the grids of said phase shift tubes connected together and receiving an input from said direct current biasing means.

6. Frequency controlling means for a synchro cyclotron comprising, a cover member, a dee system mounted in the cover member, a rotor shaft rotatably supported in the cover member, first rotor condenser plates mounted on the rotor shaft within the cover member, first stator condenser plates mounted to the dee system, second stator condenser plates mounted to the cover member, second rotor condenser plates mounted on the rotor shaft externally of the cover member and having the same general shape as the first rotor condenser plates, third stator condenser plates supported adjacent the second rotor condenser plates, fourth stator condenser plates mounted adjacent the second rotor condenser plates, a fixed frequency oscillator connected to the third stator condenser plates, a rectifier connected to the fourth stator condenser plates, direct current biasing means connected to the rectifier, a frequency modulation oscillator connected to the direct current biasing means, energy coupling means connected to the frequency modulation oscillator and coupled to the dee system of the cyclotron, said frequency modulation oscillator comprising a ring oscillator with a plurality of broad band amplifier tubes connected with phase shift circuits between them, and the phase shift circuits having phase shift tubes which receive the input from the direct current biasing means on their control grid to vary their plate to cathode resistance.

WINFIELD W. SALISBURY.

References Cited in the file of this patent

UNITED STATES PATENTS

| Number | Name | Date |
|---|---|---|
| 2,007,099 | Usselman | July 2, 1936 |
| 2,321,269 | Artzt | June 8, 1943 |
| 2,463,073 | Webb | Mar. 11, 1949 |
| 2,498,759 | Korman | Feb. 28, 1950 |
| 2,545,623 | MacKenzie | Mar. 20, 1951 |